Figure 1:
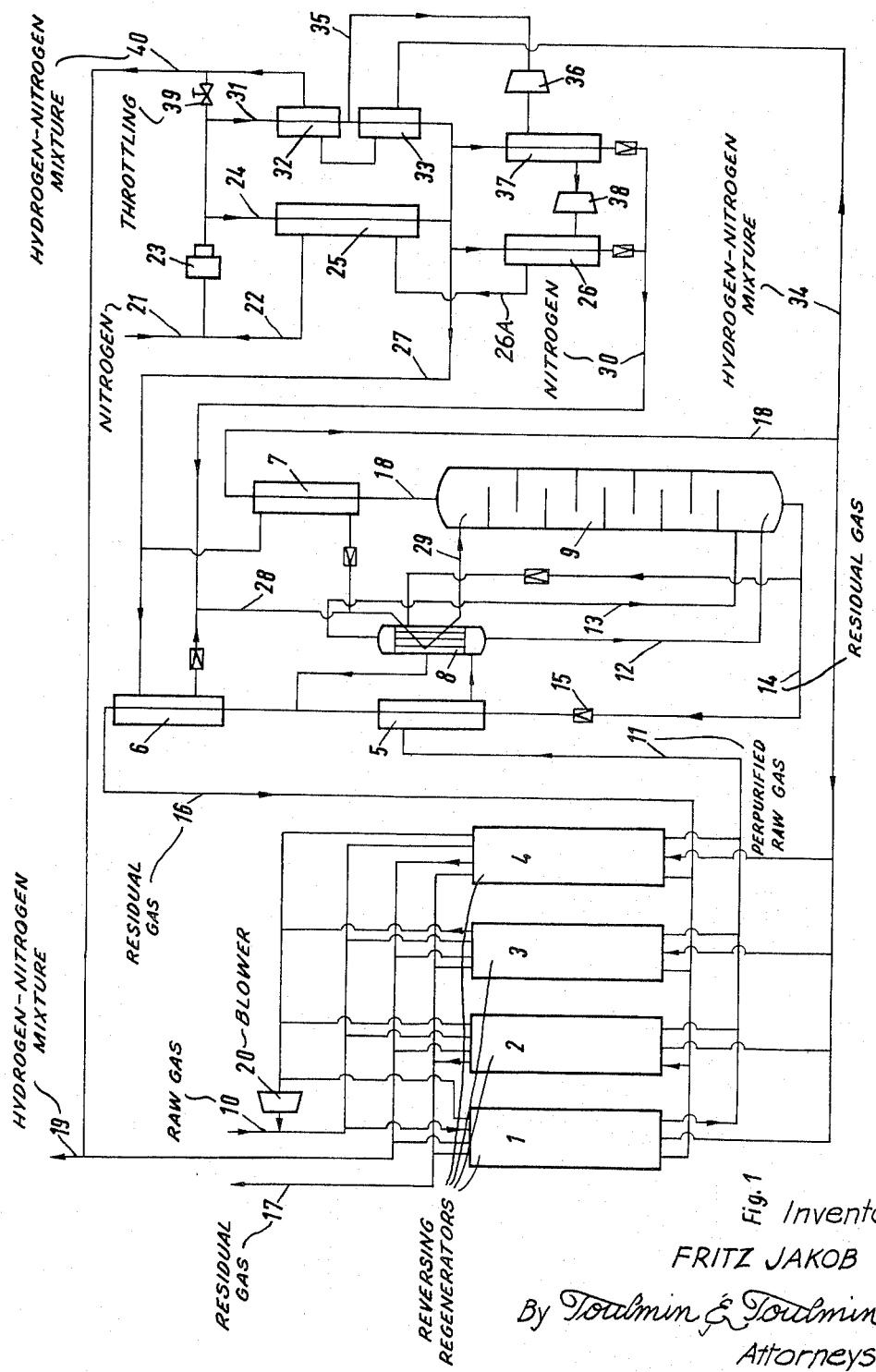

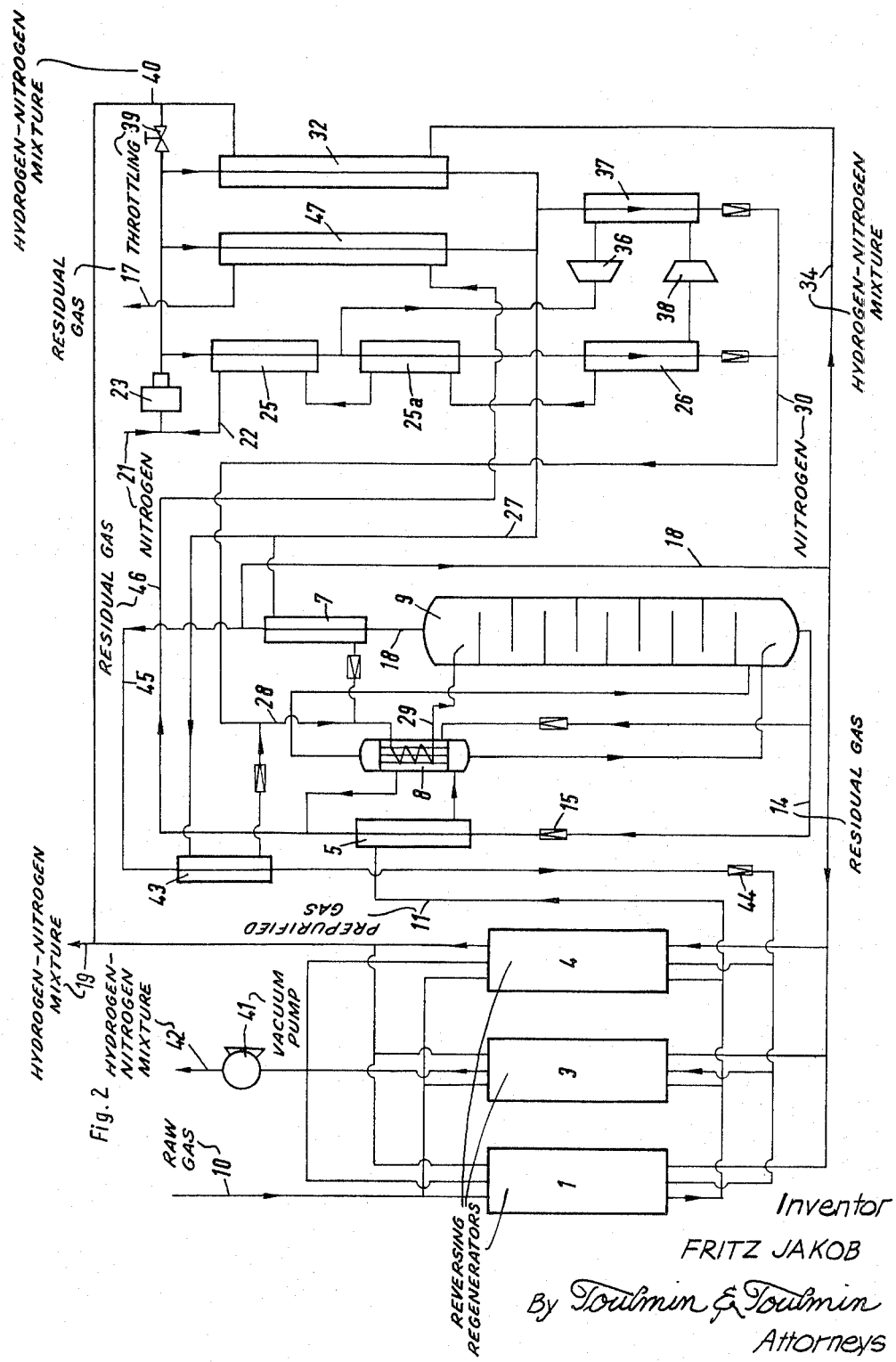

United States Patent Office 3,251,189
Patented May 17, 1966

3,251,189
GAS SEPARATION PROCESS AND APPARATUS
Fritz Jakob, Achmuhle, near Wolfratshausen, Germany, assignor to Gesellschaft fur Linde's Eismaschinen Aktiengesellschaft Zweigniederlassung Hollriegelskreuth, Hollriegelskreuth, near Munich, Germany
Filed Apr. 12, 1961, Ser. No. 116,632
Claims priority, application Germany, Apr. 14, 1960, G 29,467
12 Claims. (Cl. 62—13)

The present invention relates to the separation of gaseous mixtures rich in hydrogen, more particularly, to an apparatus and process for producing ammonia synthesis gas from converted gas by rectification at low temperature, preferably by employing regenerators.

It has been previously known to separate converted gas in low-temperature installations wherein the nitrogen required for forming the mixture and for rectifying is subjected to high pressures and wherein tubular heat exchangers are employed to cool the gas which is to be separated. When tubular heat exchangers are used, however, a rough and then a final thorough washing of the gas is necessary in order to remove carbon dioxide therefrom. Further, the gas which is to be separated is generally precooled in a cooling stage with the refrigeration being provided by a cooling medium from an external source. Requirement of this external source means that additional energy is necessary to carry out the process. In addition, tubular heat exchangers have the disadvantage that nitric acid containing various sediments such as nitric oxide resins accumulate therein and thus produce a risk of explosion.

It has also been proposed to utilize regenerators for purifying and converting heated gases. This was a considerable improvement since the regenerators had greater heat-exchanging properties than tubular heat exchangers of the same size. It was thus possible to utilize the relatively poorer heat-exchanging conditions which exist at the transition from high to low pressure. In addition, the regenerators eliminated the necessity for a thorough washing and precooling of the gas. However, this process of utilizing regenerators for the separation of a converted gas was combined with a process for the separation of air. This was necessary since the cold nitrogen produced from the separation of air was required for washing and cooling the incoming gas in the regenerators.

It is therefore the principal object of this invention to provide a novel and improved gas separating process and apparatus.

It is another object of this invention to provide an apparatus and a process for low-temperature rectification of a gaseous mixture to produce ammonia synthesis gas.

It is a further object of this invention to provide an apparatus and a process for separating converted gases using regenerators.

It is an additional object of this invention to provide an apparatus and a process for separating converted gas at low temperatures without the necessity for using an installation for the separation of air.

In the present invention a converted gas can be separated without using an installation for the separation of air and by using regenerators which eliminate the necessity of utilizing compressed nitrogen.

The process of the present invention essentially comprises the separation at low temperatures of a gaseous mixture rich in hydrogen, preferably a converted gas, into a hydrogen-nitrogen mixture and into a residual gas. The removal of heat from the incoming gas is accomplished in regenerators through which is passed at least one of the products of the separation process. The regenerators are connected so that each regenerator can perform in sequence one of the stages of the operation. In this process the residual gas resulting from the separation process and/or part of the pure hydrogen-nitrogen mixture is employed for rinsing the regenerators.

In the present invention the converted gas which is to be separated may contain a small percentage of carbon dioxide and is cooled in a regenerator. If necessary, the gas, after further cooling, may be washed by the liquid nitrogen in a rectifying column. A gaseous hydrogen-nitrogen mixture is removed from the top of the column. A liquid mixture of nitrogen and other impurities which comprise mostly carbon monoxide and methane accumulates in the bottom of the column and is evaporated exteriorly of the column. The gas as removed from the bottom of the column is known as residual gas.

In the cycle of the process of this invention the residual gas is expanded, warmed and discharged from the apparatus through a regenerator. This residual gas cleans the regenerator of impurities. Any residual gas remaining after this cleaning of the regenerator is then rinsed by a relatively small quantity of pure hydrogen-nitrogen mixture. This scavenging gas can then be combined with the incoming gas, which is to be separated through a blower or compressor which raises the pressure of the gas to compensate for the pressure drop in the apparatus. The major portion of the separated hydrogen-nitrogen mixture emerges from the apparatus through a regenerator which has been thoroughly rinsed.

It is pointed out that in this process the residual gas when it is introduced into the regenerators has a higher temperature than the incoming gas emerging from the regenerators. This means that there is a loss in cold since the hydrogen-nitrogen mixture subsequently flowing through the regenerators has to be made colder. This, however, creates almost ideal conditions for the sublimation process which is particularly characteristic of the residual gas cycle. Nevertheless, the incoming gas must be maintained at considerable pressures in order to establish appropriate sublimation conditions since the quantities of the residual gas are relatively small and comprise only about 8 to 10% of the quantity of the incoming gas. For this reason the incoming gases are preferably maintained at a medium pressure of 10 to 30 atmospheres. This pressure range is particularly advantageous since gasification under pressure is then also performed under medium pressure.

The second quantity of scavenging gas is only slightly dependent on the desired purity of the final separated product since the quantity of the residual gas remaining in the regenerator is always a very small fraction of the quantity of incoming gas. The quantity of scavenging gas, however, very closely depends on the volume of the regenerator. For this reason and to decrease switching losses incurred from switching the regenerators to different stages of the cycle, the regenerators are packed with metal so as to have an extraordinary small volume of spaces therein.

In one or both rinsing stages the scavenging gas can be passed through the regenerators under a vacuum.

In a modification of this invention three regenerators can be used in a three-stage process. In the second or cleaning stage a pure hydrogen-nitrogen mixture is passed under vacuum through the regenerator in which impurities were accumulated as a result of the first stage. In the third stage the pure hydrogen-nitrogen mixture is passed through the cleansed regenerator.

The process of the present invention has several advantages which are not present in previously known processes. These advantages are as follows:

(1) It is not necessary to use an installation for the separation of air for the process of this invention since either or both the residual gas or the hydrogen-nitrogen mixture which is formed can be used as a scavenging or rinsing gas.

(2) It is not necessary to remove all of the carbon dioxide contained in the incoming gas since the process will operate with a small percentage of carbon dioxide in this gas. Further, a thorough washing or purification of the gas with respect to the removal of carbon dioxide is not necessary and accordingly the energy requirements for this process are considerably reduced.

It is also possible to eliminate a rough washing or purification of the incoming gas to remove carbon dioxide therefrom if regenerators are used whose characteristics enables them to receive the entire quantity of carbon dioxide.

(3) No system for precooling the incoming gas is necessary.

(4) The apparatus of this invention is not contaminated by oil since dry operating compressors are used.

(5) The explosion hazard caused by nitrous oxides is greatly reduced. Actual operation of the apparatus of this invention has shown that the accumulation of nitric oxides in the regenerators is not at all dangerous.

Other objects and advantages of this invention will be apparent upon reference to the accompanying description when taken in conjunction with the following drawings, wherein FIGURE 1 is a schematic diagram of one form of apparatus for carrying out the process of this invention wherein four regenerators are used in a four-stage process;

FIGURE 2 is a schematic diagram of another form of apparatus wherein three regenerators are used.

A specific embodiment and a modification of the apparatus of this invention as well as the process will next be described with reference to the drawings wherein like reference symbols indicate the same parts throughout the various views.

In FIGURE 1 the apparatus comprises four regenerators 1 through 4 of the packed metal particle type. It is possible to employ other forms of reversible heat exchangers in place of the regenerators but the use of regenerators has been found to be satisfactory. The regenerators can be of the type having passages therethrough which are separated from the metallic packing and the passages can be formed by spiral coils mounted therein. By using such regenerators it would be possible to use only two regenerators in this apparatus instead of the four regenerators as described.

The apparatus also comprises heat exchangers 5, 6 and 7, an evaporator 8 and a rectifying column 9. The supply line 10 has a plurality of branches connected to the warm ends of the regenerators. The cold ends of the regenerators 1 through 4 are connected through a line 11 to the heat exchanger 5 with the outlet of this heat exchanger being connected to the evaporator 8. The bottom of evaporator 8 is connected by a line 12 with the lower end of the rectifying column 9. The upper end of the evaporator 8 is connected by a line 13 with the lower portion of the rectifying column. There is a line 14 which connects from the bottom of the rectifying column 9 through the heat exchangers 5 and 6 and to the cold ends of the regenerators 1 through 4 through a line 16. An expansion valve 15 is provided in the line 14 between the rectifying column and the heat exchanger 5.

An exhaust line 17 is connected to the warm ends of the regenerators for exhausting residual gas therefrom.

The top of the rectifying column 9 has a line 18 extending therefrom which passes through the heat exchanger 7 and then connects with a line 34 one end of which is connected to the cold ends of the regenerators. There is a seconed exhaust line 19 connected to the warm ends of the regenerators for discharging the separated gaseous product therefrom., There is a blower 20 which has its intake connected to the warm ends of the regenerators and its outlet connected to the supply line 10.

The nitrogen necessary for establishing the stoichiometrical relationships necessary for the production of ammonia is supplied to the installation through the conduit 21 which is connected to the intake of a compressor 23. A line 22 used for nitrogen circulation also connects to the line 21 to feed into the compressor intake. A line 24 is connected to the outlet of the compressor 23 and passed through a heat exchanger 25 whose outlet is connected to a line 27 which is connected to the heat exchanger 6. A branch conduit also leads from the line 27 through a heat exchanger 26. The line 27 emerges from the heat exchanger 6 as a line 28 and passes through evaporator 8 from which emerges line 29 and is connected to the top of the column 9.

There is a line 30 connected to one end of the heat exchanger 26 which line is also connected to the line 28.

There is also connected to the outlet of the compressor 23 a line 31 which passes through heat exchangers 32 and 33 to be connected to line 27. The line 34 connects to one side of the heat exchanger 33 which is then connected to the heat exchanger 32.

A circuit for circulating nitrogen is formed by a conduit 35 connected between the heat exchangers 32 and 33 to the inlet of a turbine 36 and then to a heat exchanger 37. Also in the circuit is a second turbine 38 connected between the heat exchangers 37 and 26. The circuit continues by a line 26A extending from the heat exchanger 26 to the heat exchanger 25 and then into line 22. The inlet of the heat exchanger 37 is connected to the line 27 and the outlet to the line 30 through a valve.

There is a valve 39 connected to the outlet of the compressor 23 which leads into a line 40. The line 40 is also connected to the heat exchanger 32 and extends to the exhaust line 19.

In carrying out the process of this invention with the apparatus as previously described, a prepurified converted gas having only about 5% carbon dioxide therein is admitted through the supply line 10 under a pressure of approximately 25 atmospheres to the regulator 1. The apparatus as described and illustrated in FIGURE 1 is shown in that stage of operation wherein regenerator 1 cools the incoming gas which is to be separated, regenerator 2 is rinsed by a residual gas, regenerator 3 is cleaned by passing a small portion of the hydrogen-nitrogen mixture through the passages that were previously rinsed by residual gas, thereby purging the passages of any remaining residual gas which has accumulated therein, and regenerator 4 warms the major portion of the hydrogen-nitrogen mixture which passes therethrough and is discharged through the line 19.

While not described, suitable switching arrangements can be provided for switching the operation of the regenerators in sequence through each of the above-described stages.

The incoming gas is cooled in regenerator 1 to a temperature lower than the residual gas entering the cold end of the regenerator and then flows through the conduit 11 to the heat exchanger 5, through the evaporator 8 in which it is further cooled in a heat-exchanging process with evaporating residual gas and subsequently partly liquefied. The liquefied portion then flows through conduit 12 into rectifying column 9 and the gas portion is emitted into the column through the conduit 13. A liquid residual gas which is a mixture of nitrogen and impurities, particularly carbon monoxide and methane, accumulates in the bottom of the column.

This residual gas mixture is tapped from the column through the conduit 14 where it is expanded in the valve 15, evaporated in the heat exchanger 5, further heated in the heat exchanger 6 and conducted through conduit 16 into the cold end of the regenerator 2. This residual gas cleanses regenerator 2 and is discharged from the apparatus through the exhaust conduit 17.

The pure hydrogen-nitrogen mixture is removed and is heated by condensed nitrogen in the heat exchanger 7 to the temperature desired at the cold ends of the regenerators. The major portion of this hydrogen-nitrogen mixture passes through the regenerator 4 in which it is tempered and is discharged from the apparatus through the conduit 19.

A small portion of the hydrogen-nitrogen mixture is flowed through the regenerator 3 wherein it cleanses the regenerator from the residual gases remaining therein during the cleaning stage. This hydrogen-nitrogen mixture which is now impure because of the contact with the residual gas is then passed into the gas supply line 10 through the blower 20. The blower 20 compensates for the pressure drop of the gaseous mixture occurring in the apparatus.

The nitrogen which is supplied through the conduit 21 is compressed in the compressor 23 together with circulating nitrogen flowing through the conduit 22. The pressure of the condensed nitrogen is one of two atmospheres greater than the pressure of the incoming gas through the supply line 10.

A portion of the compressed nitrogen is branched off through conduit 24 and cooled in the heat exchanger 25 in countercurrent flow with the circulating nitrogen. A portion of this saturated nitrogen vapor is then passed through the line 27 to the heat exchanger 6 where it is condensed. The nitrogen emerging through the heat exchanger 26 is expanded to the pressure of the column 9 and is passed through the conduit 28 to the evaporator 8 in which it is subcooled and then passed as a washing liquid through conduit 29 into the rectifying column 9. A portion of the saturated nitrogen vapor from heat exchanger 25 is liquefied in the heat exchanger 26; the resultant liquid is passed through conduit 30, and is then combined in line 28 with the liquid nitrogen which has emerged from the heat exchanger 6.

Another portion of the nitrogen compressed in the compressor 23 flows through line 31 to the heat exchanger 32 in which it is cooled by hydrogen-nitrogen mixture which has been tapped through conduit 34 from the quantity of gas being supplied to regenerators 3 and 4. The quantity of this gas is approximately equal to the quantity of nitrogen supplied through conduit 21. The cooling gas emerging from heat exchanger 32 is then conducted through line 40 to be mixed with the hydrogen-nitrogen mixture leaving the installation through conduit 19. To the mixture flowing through conduit 40 any necessary nitrogen may be added to yield the mixture ready for the ammonia synthesis through the valve 39.

A portion of the nitrogen cooled in the heat exchanger 32 is further cooled to its saturation point in the heat exchanger 33. The major portion of this cooled nitrogen is conducted through line 27 to the heat exchangers 6 and 7 in which it is condensed. The other portion of the nitrogen is liquefied in the heat exchanger 37 and supplied through conduits 30 and 28 to the evaporator 8.

Circulating nitrogen is tapped from between the heat exchangers 32 and 33 by the conduit 35 and then expanded in the turbine 36 to a presusre of approximately 3 to 5 atmospheres. The expanded nitrogen is then heated in the heat exchanger 37 counter-currently with the condensed nitrogen and then further expanded in the turbine 38 to a pressure of approximately 1 to 2 atmospheres. The circulating nitrogen is then returned to the compressor 23 through heat exchangers 26 and 25 and the conduit 22.

The circulating nitrogen may also be tapped through the conduit 35 from the center of the heat exchanger 25 or from both places.

Proceeding next to FIGURE 2 there is illustrated another form of apparatus wherein only one rinsing stage for a regenerator is used. The hydrogen-nitrogen used in the rinsing or cleaning is passed to the regenerators under a reduced pressure. Since no cleaning by residual gas is necessary regenerator 2 is superfluous and the apparatus can operate in three stages with three regenerators 1, 3 and 4, as illustrated.

The gas to be separated is introduced into regenerator 1 through the supply line 10 and the pure gas ready for ammonia synthesis is discharged from the apparatus through the exhaust line 19. A vacuum pump 41 is connected to the warm end of the regenerator 3 to pull pure synthesis gas therethrough to clean the regenerator. The gas is then passed through conduit 42 to a carbon dioxide washing apparatus from which it is mixed with the incoming gas.

After the gas from the rectification column 9 is passed through heat exchanger 7, it is then passed through a conduit 45 through a heat exchanger 43 countercurrently with nitrogen flowing therethrough, and further conducted through the regenerator 3 through valve 44. In this apparatus the residual gas is passed through the heat exchanger 5 and then conducted through conduit 46 to a heat exchanger 47 in which it is further heated by nitrogen. The residual gas then leaves the apparatus through exhaust line 17 which emerges from one end of the heat exchanger 47.

Whereas two heat exchangers 32 and 33 were employed in the apparatus of FIGURE 1 these heat exchangers have been combined into a single heat exchanger 32. The heat exchanger 25 has been divided into two heat exchangers 25 and 25a. In addition, the operating pressure may be lower than 10 atmospheres, particularly during the rinsing or cleaning process which is generally conducted under reduced pressure.

Similarly suitable switching circuits are provided to periodically switch the regenerators to perform sequentially the various stages of this process.

Thus it can be seen that the present invention comprises a novel and improved apparatus for the resolution of a gaseous mixture into a hydrogen-nitrogen mixture.

It will be understood that this invention is susceptible to further modification and, accordingly, it is desired to comprehend such modifications within this invention as may fall within the scope of the appended claims.

What is claimed as this invention is:

1. A process of separating an impure gaseous mixture comprising hydrogen, nitrogen and carbon monoxide into a product fraction of hydrogen and nitrogen, and a residual fraction rich in carbon monoxide, which process comprises the steps of:
   (1) Cooling and cleaning said gaseous mixture in a first regenerator;
   (2) rectifying the resultant cooled and cleaned gaseous mixture while employing liquid nitrogen as reflux, thereby obtaining said product fraction of hydrogen and nitrogen and said residual fraction rich in carbon monoxide;
   (3) separating said product fraction into a plurality of streams and passing a minor portion of said product fraction through passages of a second regenerator which passages had been immediately previously employed for cooling and cleaning said gaseous mixture, to remove impurities in said passages, whereby said portion of said product fraction is sacrificed for purging said passages of impurities, thereby eliminating any need for an air separation system and any need for thoroughly washing the impure gaseous mixture to remove substantially all traces of carbon dioxide prior to cleaning said gaseous mixture in said first regenerator; and
   (4) passing a major portion of said product fraction through passages of a third regenerator, which passages had been immediately previously cleansed of impurities.

2. A process as defined by claim 1 wherein said minor portion of said product fraction is passed under a vacuum through said passages of said second regenerator.

3. In a process for low temperature separation of an impure gaseous mixture comprising hydrogen, nitrogen, and carbon monoxide, the steps comprising:
(a) cooling the gaseous mixture in passages of a regenerator;
(b) rectifying the cooled gaseous mixture into a hydrogen-nitrogen fraction and a residual fraction;
(c) passing said residual fraction through the passages of the regenerator used for cooling the incoming gaseous mixture;
(d) cleaning the passages of the regenerator used for cooling the incoming gaseous mixture by passing therethrough a portion of said hydrogen-nitrogen fraction;
(e) wherein said passing of said portion of said hydrogen-nitrogen fraction in step (d) is conducted subsequent to step (c) through the same regenerator passages specified in step (c) to purge any of said residual fraction contaminating said passages.

4. The process of claim 3 futher comprising the step of combining the incoming gaseous mixture with the portion of the hydrogen-nitrogen fraction that has been expended for purging purposes.

5. The process of claim 3 wherein step (4) is conducted at less than atmospheric pressure.

6. The process of claim 3, wherein the residual fraction amounts to about 8–10% by volume of the incoming gaseous mixture.

7. A process of separating an impure gaseous mixture comprising hydrogen, nitrogen, carbon monoxide, and condensable impurities into a product fraction of hydrogen and nitrogen, and a residual fraction of nitrogen and carbon monoxide, which process comprises the steps of:
(1) cooling said impure gaseous mixture in a first regenerator zone at a pressure of about 10–30 atmospheres and depositing said condensable impurities therein;
(2) rectifying the resultant cooled and cleaned gaseous mixture while employing liquid nitrogen as reflux, thereby obtaining said product fraction of hydrogen and nitrogen and said residual fraction of nitrogen and carbon monoxide;
(3) passing said residual fraction through passages of a second regenerator zone which passages contain condensed impurities previously deposited during a previous cycle, wherein the impure gaseous mixture was cooled therein, whereby said impurities are vaporized by said residual fraction and flushed from said second regenerator zone; and
(4) passing a small portion of the hydrogen-nitrogen product fraction through a third regenerator zone having passages which had been previously employed for removing the condensed impurities by passing said residual fraction therethrough, whereby the passages are completely freed of said residual gas, so that in a subsequent step the hydrogen-nitrogen fraction can be passed therethrough without contamination.

8. The process of claim 7, comprising a further step of passing the major portion of said hydrogen-nitrogen fraction through a fourth regenerator zone having passages which were flushed of the residual fraction by the small portion of the hydrogen-nitrogen fraction.

9. An apparatus for the low temperature separation of a gaseous mixture containing hydrogen, nitrogen, carbon monoxide, and condensable impurities into a hydrogen-nitrogen fraction, which apparatus comprises a first regenerator means having warm and cold ends, a supply line for gases to be separated connected to the warm end of said first regenerator means, a first heat exchanger having an inlet and outlet for said gaseous mixture and an inlet and outlet for said residual fraction, said inlet for said gaseous mixture being connected directly by a conduit to the cold end of said first regenerator means, a second heat exchanger having an inlet and outlet for said residual fraction, said inlet of said second heat exchanger being serially and operably connected to said outlet for residual fraction of said first heat exchanger, a condenser-evaporator having an inlet and outlet for said gaseous mixture and an inlet and outlet for said residual fraction, said inlet for said gaseous mixture being operably connected to said outlet for said gaseous mixture of said first heat exchanger, a rectifying column having its lower end connected with the outlet for said gaseous mixture of said condenser-evaporator, whereby the hydrogen-nitrogen fraction is produced at the top portion of said rectifying column and the residual fraction is produced at the bottom portion of said rectifying column, a second regenerator having a warm end and a cold end, and conduit means for passing a first portion of said residual fraction from the lower end of said rectifying column through the residual-fraction side of said first and second heat exchangers to said regenerators, and for passing a second portion of said residual fraction from the lower end of said rectifying column through the residual fraction side of said condenser-evaporator and said second heat exchanger to said regenerators.

10. The apparatus of claim 9, further comprising an exhaust line for said residual fraction connected to the warm end of said second regenerator, a third regenerator having a warm end and a cold end, blower means having its inlet connected to the warm end of said third regenerator and its outlet connected to said supply line for the incoming gas, a fourth regenerator having a warm end and a cold end, an exhaust line for a separated product connected to the warm end of said fourth regenerator, the cold ends of said third and fourth regenerators being connected to said residual fluid passage means, and means for interchanging all of said regenerators.

11. An apparatus for the low-temperature separation of a gaseous mixture, which apparatus comprises a first regenerator having warm and cold ends, a supply line for gases to be separated connected to the warm end of said first regenerator, first and second serially connected heat exchangers with said first heat exchanger connected directly by a conduit to the cold end of said first regenerator, a condenser evaporator connected to said first heat exchanger, a rectifying column having its lower end connected with said condenser evaporator and producing a residual fluid therein, a second regenerator having a warm end and a cold end, conduit means for passing a first portion of said residual fluid from the lower end of said rectifying column through said first and second heat exchangers to said regenerators, and for passing a second portion of said residual fluid from the lower end of said rectifying column through said condenser evaporator and said second heat exchanger to said regenerators, an exhaust line for said residual fluid connected to the warm end of said second regenerator, a third regenerator having a warm end and a cold end, blower means having its inlet connected to the warm end of said third regenerator and its outlet connected to said supply line for the incoming gas, a fourth regenerator having a warm end and a cold end, an exhaust line for a separated product connected to the warm end of said fourth regenerator, the cold ends of said third and fourth regenerators being connected to said residual fluid passage means.

12. An apparatus for the low-temperature separation of a gaseous mixture, which apparatus comprises four regenerators each having warm and cold ends, a gas supply line connected to the warm ends of said regenerators, first and second heat exchangers with said first heat exchanger being connected directly by a conduit to the cold ends of said regenerators, a condenser evaporator connected to said first heat exchanger, a rectifying column having its lower end connected to said condenser evaporator and producing a residual fluid therein, a first line extending from said rectifying column and connected to said first and second heat exchangers and to the cold ends of said regenerators for passing a first portion of said residual fluid therethrough, another line from said first line to said condenser evaporator and therefrom back to said first line between said first and second heat exchangers for passing a second portion of said residual gas therethrough, a first exhaust line for said residual fluid connected to the warm ends of said regenerators, a blower having its intake connected to the warm ends of said regenerators and its outlet to said gas supply line, a second exhaust line connected to the warm ends of said regenerators for exhausting the separated product therefrom, and means for periodically switching said regenerators so that each regenerator periodically performs a warming of the incoming gas, a rinsing by residual fluid, cleaning by the hydrogen-nitrogen mixture and a warming of the pure separated product.

References Cited by the Examiner

UNITED STATES PATENTS

| | | | |
|---|---|---|---|
| 2,619,810 | 12/1952 | Rice | 62—14 |
| 2,659,216 | 11/1953 | Sargent | 62—13 X |
| 2,844,944 | 7/1958 | Becker. | |
| 2,895,304 | 7/1959 | Wucherer. | |
| 2,960,836 | 11/1960 | Haringhuizen | 62—13 |
| 2,962,867 | 12/1960 | Seidel | 62—13 X |
| 2,975,605 | 3/1961 | Haringhuizen | 62—13 |

NORMAN YUDKOFF, *Primary Examiner.*

ROBERT A. O'LEARY, *Examiner.*